United States Patent
Pogorelik et al.

(10) Patent No.: US 10,318,746 B2
(45) Date of Patent: Jun. 11, 2019

(54) PROVABLE TRACEABILITY

(71) Applicant: McAfee, LLC, Santa Clara, CA (US)

(72) Inventors: Oleg Pogorelik, Lapid (IL); Alex Nayshtut, Gan Yavne (IL); Ned M. Smith, Beaverton, OR (US); Igor Muttik, Berkhamsted (GB); Omer Ben-Shalom, Rishon le-Tzion (IL)

(73) Assignee: McAfee, LLC, Santa Clara, CA (US)

( * ) Notice: Subject to any disclaimer, the term of this patent is extended or adjusted under 35 U.S.C. 154(b) by 96 days.

(21) Appl. No.: 14/866,470

(22) Filed: Sep. 25, 2015

(65) Prior Publication Data

US 2017/0091467 A1 Mar. 30, 2017

(51) Int. Cl.
*G06F 21/00* (2013.01)
*G06F 21/62* (2013.01)
*G06F 17/24* (2006.01)

(52) U.S. Cl.
CPC .......... *G06F 21/6209* (2013.01); *G06F 17/24* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 2012/0303968 | A1* | 11/2012 | Balinsky ............ H04L 9/14 713/189 |
| 2013/0073619 | A1 | 3/2013 | Tumuluri |
| 2013/0218829 | A1 | 8/2013 | Martinez |
| 2014/0032677 | A1 | 1/2014 | Pittenger et al. |
| 2014/0189356 | A1 | 7/2014 | Phegade et al. |
| 2014/0362236 | A1 | 12/2014 | Harple et al. |
| 2014/0380046 | A1* | 12/2014 | Poornachandran ..... G06F 21/10 713/167 |
| 2015/0205929 | A1* | 7/2015 | Brama ............... G06F 19/3418 705/3 |
| 2016/0300070 | A1* | 10/2016 | Durham ............. G06F 21/6209 |

FOREIGN PATENT DOCUMENTS

WO 2017052944 3/2017

OTHER PUBLICATIONS

International Search Report and Written Opinion issued in PCT Application No. PCT/US2016/048510 dated Nov. 30, 2016; 10 pages.

* cited by examiner

*Primary Examiner* — Alexander Lagor
*Assistant Examiner* — Syed M Ahsan
(74) *Attorney, Agent, or Firm* — Patent Capital Group

(57) ABSTRACT

There is disclosed in an example, a computing apparatus, including: a trusted execution environment (TEE); and one or more logic elements providing a collaboration engine within the TEE, operable to: receive a change to a secured document via a trusted channel; apply a change to the secured document; log the change to a ledger; and display the document to a client device via a protected audio-video path (PAVP). There is also disclosed a method of providing a collaboration engine, and a computer-readable medium having stored thereon executable instructions for providing a collaboration engine.

23 Claims, 7 Drawing Sheets

US 10,318,746 B2

PROVABLE TRACEABILITY

FIELD OF THE SPECIFICATION

This disclosure relates in general to the field of computer security, and more particularly, though not exclusively to, a system and method for secure traceability.

BACKGROUND

A protected audio-video path (PAVP) is a species of protected media path, which creates a "protected environment." A PAVP is often used to enforce digital rights management (DRM) protections on media purchased by users. Component parts of a PAVP may include a protected video path (PVP) and protected user mode audio (PUMA). PAVP is often considered an attempt to plug the "analog hole" of DRM protection, meaning that once a signal is converted to a human-perceptible analog form, that form may be recordable in a non-protected format.

In an example PAVP, the protected environment includes media components that play the DRM content, so the end-user application handles unprotected content data. The protected environment may also provide signed third-party modules and plugins. This provides a "walled garden" where the DRM content is processed, without providing the unprocessed content to any unapproved application, though application-programming interfaces (APIs) may be provided so that external applications can control playback (e.g., "Play," "Rewind," "Pause," "Next," and so forth).

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1A:
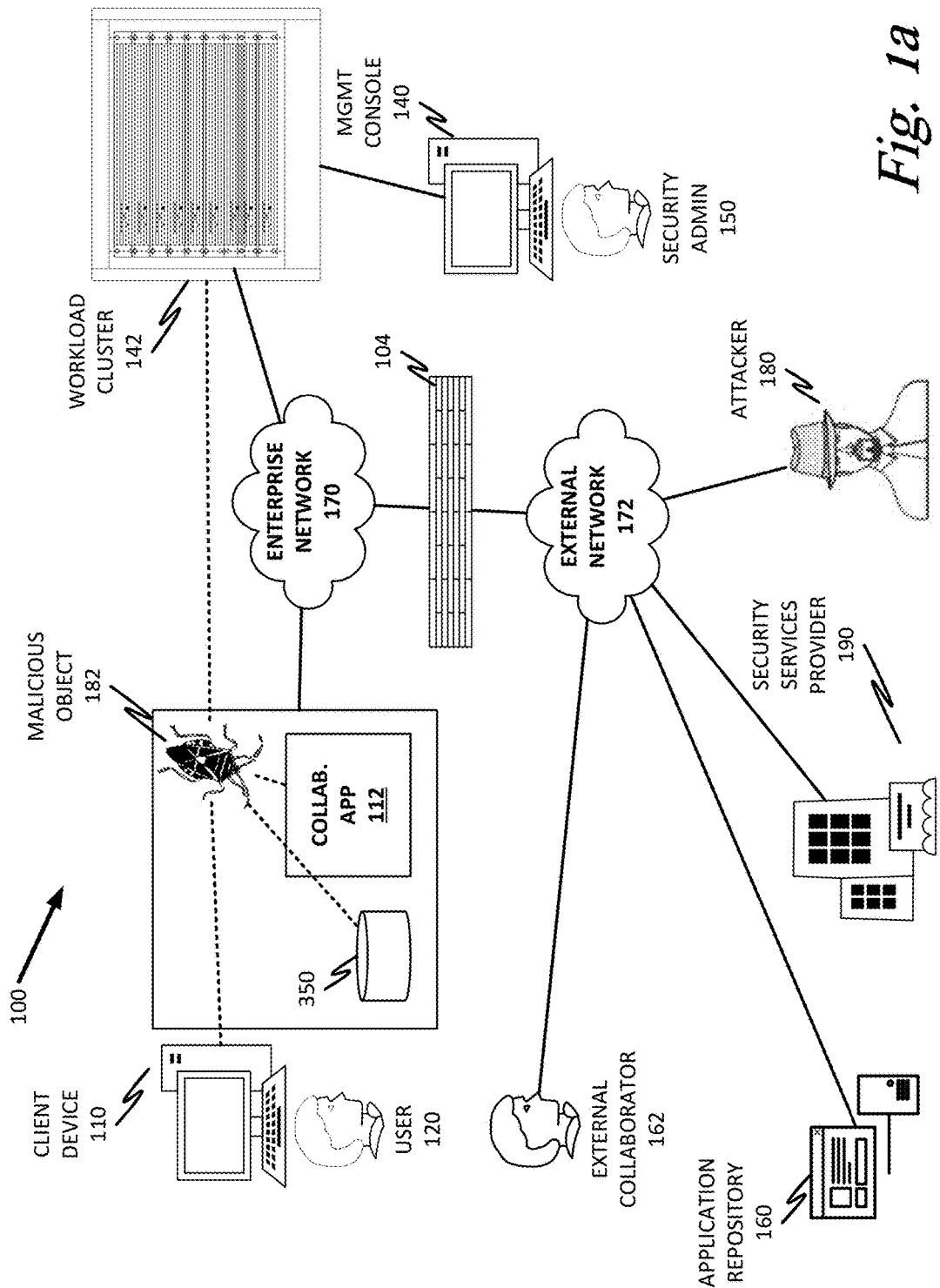
FIGS. 1A and 1B are a block diagram of a security-enabled network according to one or more examples of the present specification.

There is disclosed in an example, a computing apparatus, including: a trusted execution environment (TEE); and one or more logic elements providing a collaboration engine within the TEE, operable to: receive a change to a secured document via a trusted channel; apply a change to the secured document; log the change to a ledger; and display the document to a client device via a protected audio-video path (PAVP). There is also disclosed a method of providing a collaboration engine, and a computer-readable medium having stored thereon executable instructions for providing a collaboration engine

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Version control systems and content versioning systems are often employed by programmers and document authors to track which changes are made when, and by whom, in a particular document. For example, in a Microsoft Word document, native proprietary change tracking may be enabled. Whenever a person makes a change to a baseline version of the Word document, the change is displayed as a "redline" or markup version of the baseline, and may be tagged with an identifier of the author. Similarly, in a source control version control system, a programmer may "check out" a source code file, which locks the file for editing by others. The programmer may then work on the plain text source file, making changes as necessary, and then "check in" the source code file. When the user checks in the source file, the version control system performs a "diff," comparing the new version of the file to the baseline version. The system then enters the "diff" results into its database, so that the new version of the file can be reproduced from the baseline version. If the file is new, the "baseline" may be essentially an empty file. Thus, the system can reconstruct the state of each file in the source tree at a given time.

In addition to its DRM application, a PAVP can also be used to provide provable traceability according to this specification. This represents an example cross-application between a security mechanism, a DRM mechanism, and a business need for provable traceability for any of various reasons.

Consider, for example, an application wherein actors from a plurality of enterprises work together on an improvement to an existing technology. This is a common occurrence when companies who may be business competitors join together as part of a standards body to develop and improve standards that are then used by industry actors. One of the valuable results of this exercise is that employees of the companies may develop standards-essential patents, which in many cases can then be included within the standard provided that a "fair, reasonable, and non-discriminatory" (FRAND) license is offered.

But if several engineers or scientists from different companies are jointly working to develop an improvement to the standard, questions may arise about who invented what. Depending on the value of the innovation, this can lead to protracted and expensive legal battles over patent ownership.

Thus, it is advantageous to provably trace who contributed what to a particular discussion. Throughout this specification, joint editing of a document is used as a non-limiting example of a use case where provable traceability may be desirable for keeping track of who contributed what. But it should be noted that many other examples are possible. In the first place, a "document" should be broadly construed to include any network object, including static objects and executable objects that may be changed. In some cases, the "document" may be an entire file system or database, or other large, complex object.

Provably tracing changes to such a document may be provided for any suitable purpose. For example, if the "object" is a security object, traceability may indicate who changed what so that network errors can be more fully investigated. It may also be used to detect unauthorized changes to a network (e.g., changes that have no provable pedigree, and which are thus suspect of being malicious attacks from without the organization). Traceability can be used within an organization to assign credit for both inventions and mistakes. For example, some organizations offer patent awards to employees, and divide the sum patent award among all inventors apportioned by magnitude of contribution. In that case, it may be important to know who contributed what key feature. Traceability can also be used to evaluate employee performance, such as keeping track of who contributed what to an enterprise's success. In a legal perspective, traceability can be an evidentiary matter, such as proving who performed which actions or said which things at critical times. Importantly, because the traceability of the present specification is provable, accusations of manufacturing or doctoring evidence can be prospectively defeated by preserving a provable path.

Focusing now on the illustrative example of a group of inventors (either within an enterprise, or across multiple enterprises) working on a collaborative document that may eventually include numerous ideas that can be developed into multiple patent claims, each author on the collaborative document operates a client device. The client device includes a trusted execution environment (TEE), which can provide a PAVP. To prevent tampering, an operating system may provide process isolation and monitor what kernel-mode software is loaded. If an unverified or untrusted process is loaded, then the operating system may stop displaying the protected content to avoid tampering.

Restrictions may also be placed on audio and video outputs of the client devices. For example, encrypted digital outputs such as Digital Video Interface (DVI) or High-Definition Multimedia Interface (HDMI) may provide high-bandwidth digital content protection (HDCP), to prevent unauthorized capturing or altering of content.

The document itself may be hosted on a collaboration server, which may be configured to provide detailed change histories as well as metadata logs. For example, the collaboration server may provide revision control, content versioning, proprietary change tracking (such as in Microsoft Word documents or other similar formats), text-based file comparison, binary file comparison, and any other change tracking mechanism. In these examples, a user may "check out" a file to work on it, thus locking the file out from other users, until the user "checks in" the file thus making it available for editing by others. However, many contemporary systems also provide real-time, truly collaborative editing in which multiple users can view and edit a document at the same time, with changes to the document appearing in real-time while it is edited. This document has been used successfully, for example, by Google Docs and others. Many other system architectures are possible, and are intended to be included within the broad scope of this disclosure.

Whatever specific mechanism is used, in a general sense, a "baseline" version of the document may be established as a starting point. This baseline may be the original document, or it may be some later version of the document that is treated as a reference point. In some cases, the baseline will include the full content of the document as a static entity. The collaboration server then keeps track of incremental changes to document as they are provided by specific users, either in real-time or in a check-out/check-in structure. Keeping track in this instance comprises identifying both the content of a change, and the identity of the user who made the change, along with other metadata.

Because each client device has a TEE, a change may be provably tied to that device because it has a universally unique identifier (UUID), which may include an encryption key that cannot practically be spoofed by any other device. In one example, a TEE provably traces its contributions by affixing a secure hash of its UUID to a data unit that includes the change. Traceability may therefore be preserved with an attestation protocol, for example in which a TEE hashes its UUID, and the attestation succeeds only if the hashes match.

This provides secure traceability to the TEE itself, however, there is still a matter of traceability to a user of the client device that includes the TEE. There are many ways in which a user authenticates himself to a client device, and some are more secure than others. It should be recognized that conceptually, a goal of the transaction is to provide evidence of traceability, and evidence may include a concept of "weight," rather than being a mere Boolean matter of "verified" or "not verified." Thus, in one example, an identifier is appended including the type, strength, and identity of authentication for a person purporting to operate the client device. These data may themselves be hashed so that the identity of the user cannot be reconstructed by a third party, but claims of authorship can be verified when a person provides matching data, which result in a matching hash.

In some cases, a cryptographically signed data unit may include additional data beyond merely the UUID of the TEE. Metadata may also be attached, including for example the time and date of the change, the identity of the user, the type and strength of authentication, the application used, the presence of other (particularly untrusted) computing threads, and any other conditions that may be useful in reconstructing the circumstances of the edit.

These metadata fields may be attached to the data unit in plain text form or any other suitable form by which they can be reconstructed, with a verifiable hash. Throughout this specification, "clear text" is used to refer to any type of data, whether text, binary, or other, that is readable by a human or computer without the use of cryptographic keys or information; or stated otherwise, "clear text" includes anything that is not encrypted or secured.

For additional security, instead of, or in addition to, providing these clear text data fields, the metadata itself may be cryptographically hashed so that it too is verifiable. In one example, to preserve privacy, no metadata fields are affixed to the data unit in real-time. Rather, one or more cryptographic hashes may be attached, so that a later claim that a particular change was made by a particular person at a particular time in a particular environment with a particular strength of authentication can be verified cryptographically, but not reconstructed in reverse. This may help to prevent malicious actors from reconstructing chains of authorship and gaining unauthorized access to information.

For further security, operations may be divided between a collaboration server and a logging server. In this case, the collaboration server may maintain a clear text list of changes, and (optionally), clear text metadata about each change. The logging server may, in one embodiment, maintain only cryptographic hashes of the changes and any metadata attached to those changes. Thus, the logging server may be operated by a trusted third party, such as an escrow service, even if that third party is not authorized to access the clear text data. Later, if there is any dispute about the authenticity or traceability of records maintained by the collaboration server, the escrowed cryptographic hashes can be used to verify or rebut the integrity of the records.

Thus, in the example where there is an inventorship dispute between different inventors or enterprises, traceability data on the collaboration server can be used to assign individual inputs to individual users with significant confidence. Cryptographic hashes of traceability data may be maintained either on the collaboration server, or on a third-party logging server operated in one example by a trusted escrow service. In the case of a legal dispute, cryptographic hashes may be logged with the court or presiding authority at the beginning of the case or at the beginning of production, thus providing a provable way to ensure that data have not been tampered with during the production process.

In an embodiment, during editing, content may be rendered exclusively on the collaboration server, and exposed to the authors or only participants using PAVP, for example in a view-only mode. Editing may be tracked via keyboard-video-mouse (KVM) sequences, as described above.

Further in an embodiment, all commands (including editing commands) are individually signed by the author for authenticity and integrity. The collaboration server may maintain a content master (baseline) copy of the document, including detailed metadata.

Further in an embodiment, a logging server may be maintained in a public or distributed ledger, thus making tampering more difficult. This may ensure that no author of the document may modify the document in an untraceable way, and that no malicious attacker can creditably modify the ledger, even if he is able to gain unauthorized access to a network. On the other hand, an author who wishes to prove his contribution can do so by providing information that when hashed, matches the log.

Embodiments of the present specification may be relevant even when attribution and authorship are not a concern. For example, rendering a document server-side, displaying it only via secure PAVP, and tracking edits as a change stream may be a useful security feature when, for example, there is concern about "screen scrapers" or other security breaches capturing sensitive documents. In that case, because the video path is protected end-to-end, it does not ever appear as an analog signal that can be captured and processed by a malicious third party. This security scheme can be combined with other security measures, such as antivirus engines, security scanners, firewalls, and similar that are configured to lock out malicious actors.

A system and method for provable traceability will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. In the example of FIG. 1, secured enterprise 100 may be configured to provide services or data to one or more customers, who may access information or services via external network 172. This may require secured enterprise 100 to at least partly expose certain services and networks to the outside world, thus creating a logical security aperture.

Within secured enterprise 100, one or more users 120 operate one or more client devices 110. In this example, user 120 collaborates with an external collaborator 162, who is not part of enterprise 100. This should be understood as a nonlimiting example, and it is expressly intended that in other embodiments, a collaborator could be within enterprise 100. In the case where external collaborator 162 is external to enterprise 100, special considerations may arise, such as the security implications of granting an external collaborator 162 access to certain network resources within enterprise 100. Security may be particularly important as even if external collaborator 162 is himself a good actor, an attacker 180 may wish to breach the network and perform malicious work thereon. Thus, a security administrator 150 may be appointed to manage network resources within enterprise 100 to ensure that user 120 and external collaborator 162 can safely collaborate across enterprise boundary 104 without compromising the security of enterprise network 170.

Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

Figure 2:
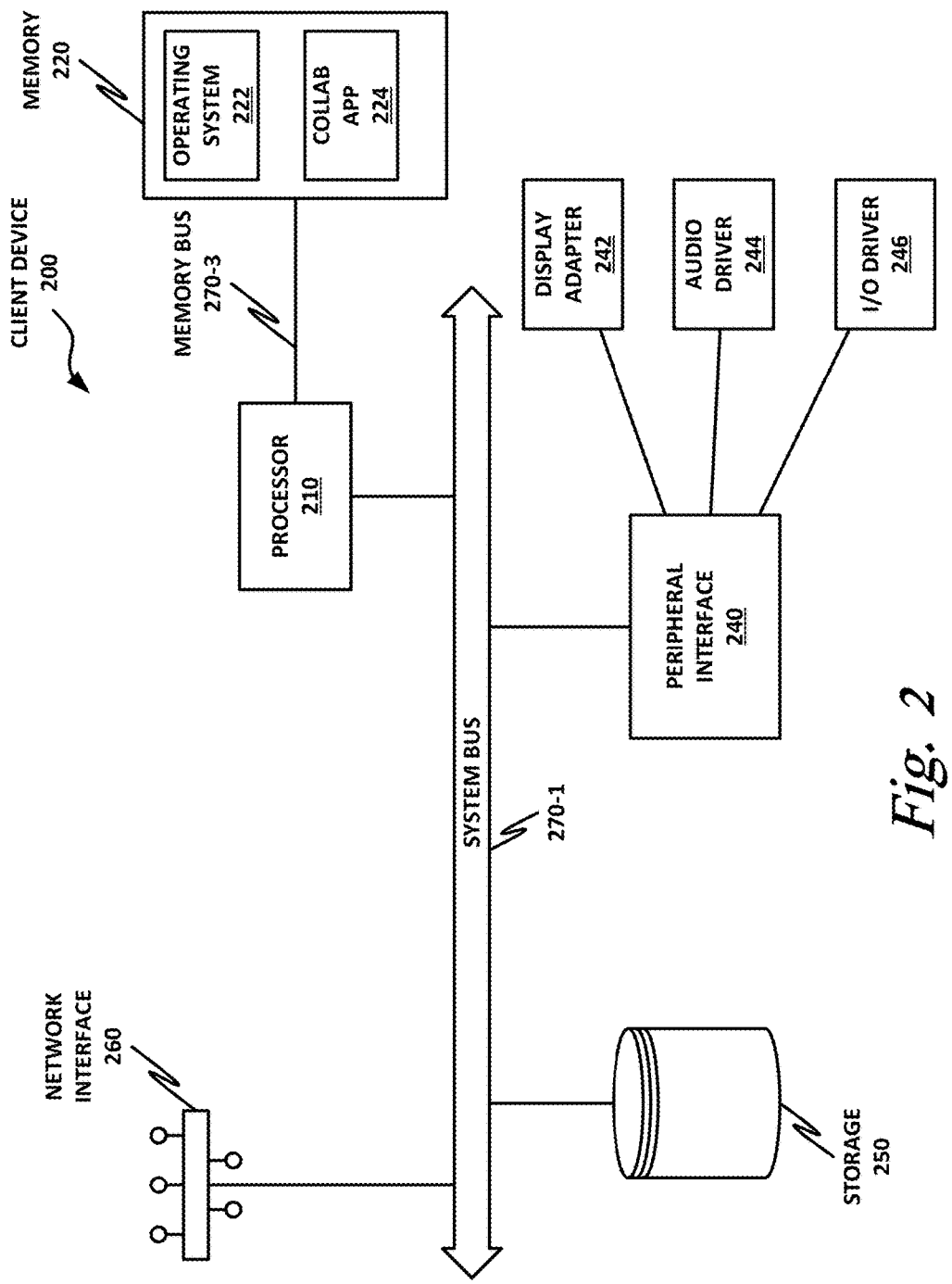
FIG. 2 is a block diagram of a computing device according to one or more examples of the present specification.
Figure 3:
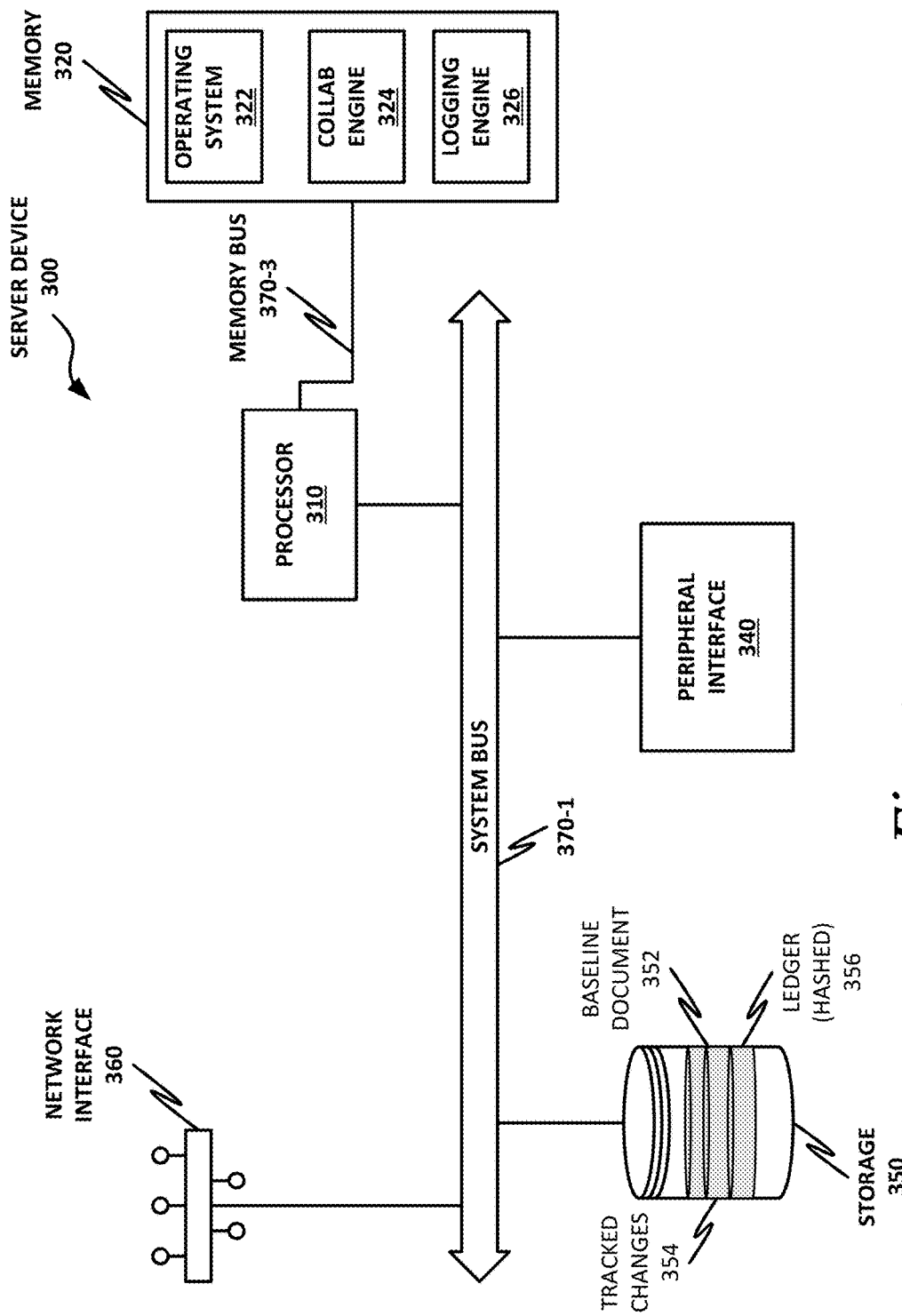
FIG. 3 is a block diagram of a server according to one or more examples of the present specification.

In certain embodiments, workload cluster 142 may include a collaboration server 146 and logging server 144 (both shown in FIG. 1B), along with other suitable network appliance virtual machines. However, collaboration server 146 and logging server 144 may also be standalone devices, or could be provided as a function on a client device 110. Collaboration server 146 and logging server 144 may both be examples of server-class devices 300, as shown in FIG. 3, while client devices may be examples of computing devices 200, as shown in FIG. 2.

It should also be noted that some functionality of client devices 110 may also be provided via workload cluster 142. For example, one microcloud may provide a remote desktop hypervisor such as a Citrix workspace, which allows users 120 operating client devices 110 to remotely login to a remote enterprise desktop and access enterprise applications, workspaces, and data. In that case, client 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In another case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying collaboration application 112 (which may be running in memory), or gaining access to workload clusters 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 1B:
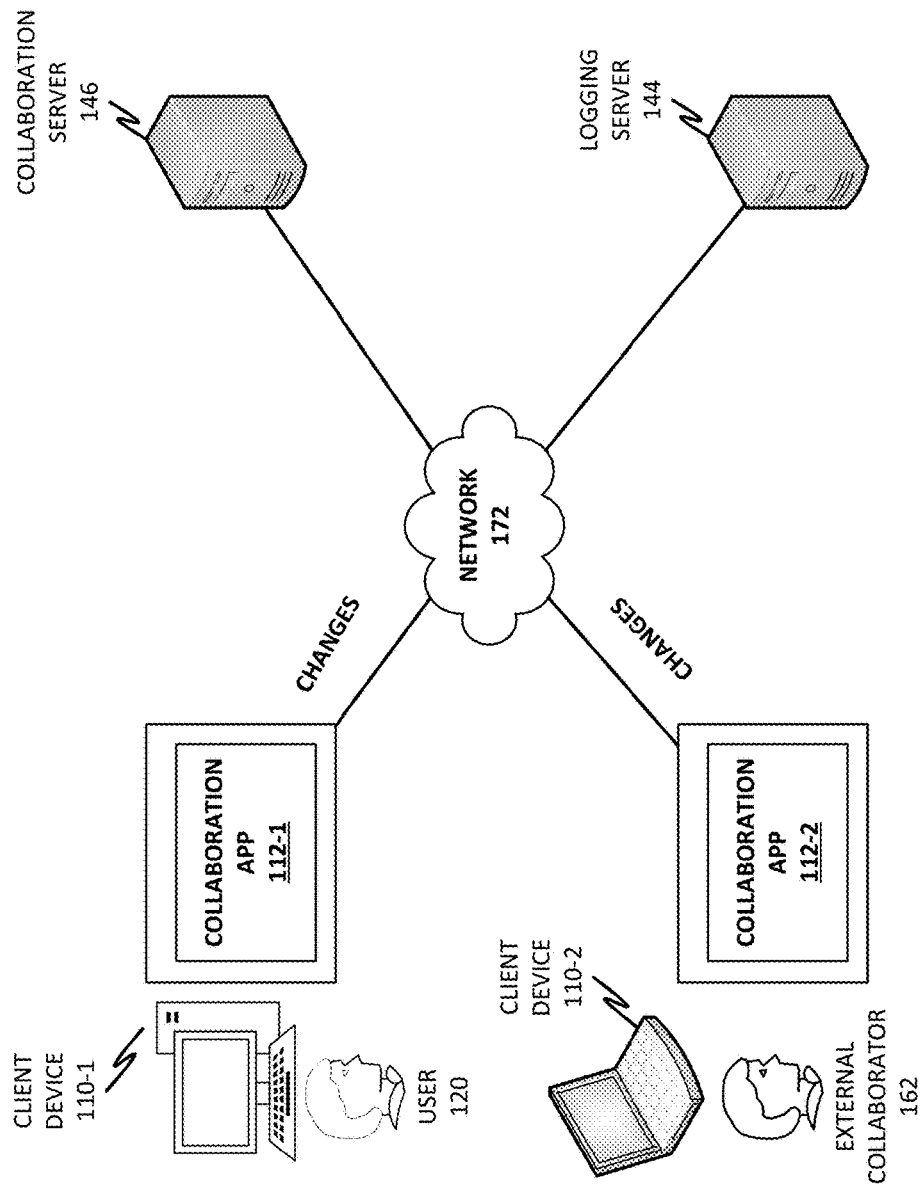

FIG. 1B discloses additional details of a plurality of authors collaborating to edit a document. Collaboration server 146 may be configured to provide real-time or off-line collaboration services in which each author is able to either edit the document in real-time, or check the document out, make changes, and check it back in. Collaboration server 146 may maintain a detailed change tracking history, such as a serialized stream of edit commands, which in one example may be encrypted.

In this example, logging server 144 is provided separately from collaboration server 146. However, it should be recognized that in other embodiments, they may be provided in a single device, or as separate virtual appliances in a microcloud. In this example, logging server 144 receives only hashes of tracked changes and metadata. These hashes may be reconstructed with a key value pair (KVP) having the appropriate parameters. Thus, a claim about a particular edit or entry may be verified cryptographically. However, the actual edits may not be reconstructed from the hashes logged in logging server 144. It should also be noted that logging server 144 may be distributed, or copies of the ledger may be synchronized across multiple devices. In this case, logging server 144 may be a public or semi-public entity that can be mirrored by any interested party. This provides additional confidence and verifiability, as it is difficult or impossible to track down and change every copy of a mirrored change log.

User 120 and external collaborator 162 may both be authors of a document posted on collaboration server 146. User 120 and external collaborator 162 both operate a client device 110, specifically user 120 operates client device 110-1, and external collaborator 162 operates client device 110-2. Each client device 110 is equipped with a collaboration app 112. Collaboration app 112 provides a local interface for user 120 and external collaborator 162 to work on the document, and to view the document. Client devices 110 may communicate with collaboration server 146 and/or logging server 144 via network 172. When user 120 and external collaborator 162 make changes to the document, those changes are submitted to collaboration server 146, for example as encrypted KVM edit commands. Collaboration server 146 may keep a detailed log of all edit commands, so that the document's state can be reconstructed at any designated time. In one example, the changes are cryptographically tracked using a key value pair. This may be referred to as a cryptographic change sequence. When collaboration server 146 enters one or more changes from user 120 and external collaborator 162, those changes may be logged to logging server 144, along with a hash of any relevant metadata.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a collaboration application 424. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processors may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of collaboration application 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Trusted execution framework (TEF) 424, in one example, is operable to carry out computer-implemented methods as described in this specification. TEF 424 may include one or more tangible non-transitory computer-readable mediums having stored thereon executable instructions operable to instruct a processor to provide a collaboration application 224. As used throughout this specification, an "engine" includes any combination of one or more logic elements, of similar or dissimilar species, operable for and configured to perform one or more methods provided by the engine. Thus, collaboration application 224 may comprise one or more logic elements configured to provide methods as disclosed in this specification. In some cases, collaboration application 224 may include a special integrated circuit designed to carry out a method or a part thereof, and may also include software instructions operable to instruct a processor to perform the method. In some cases, collaboration application 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that TEF 424 may also include other hardware and software, including configuration files, registry entries, and interactive or user-mode software by way of non-limiting example.

In one example, collaboration application 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of collaboration application 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a collaboration engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of collaboration engine 324.

Storage 350 in this example includes a baseline document 352. This is the "original" version of document 352 from which other versions are based. Document versions usually progress temporally (i.e., over time), but may represent other changes in condition as well, such as a document whose changes are tied to changes in network conditions or environmental factors. Occasional snapshots of document 352 may also be stored separately, capturing the state of document 352 at a particular time or condition. Several different versions of the baseline document may also be maintained, so that a previous state can be reconstructed as necessary. In general terms, the baseline document 352 includes any form of the document from which later versions can be reconstructed.

Tracked changes 354 are changes that are entered to update the state of baseline document 352. In one example, each change is tracked as a discrete unit provided in a separate data packet, with a specific time stamp and other metadata attached to it. This example is nonlimiting however. In other examples, changes 354 may be a continuous stream, may be provided as a binary stream, or may be of heterogeneous composition. Tracked changes 354 may correspond to individual changes entered by individual authors.

These changes may then be used to change the state of baseline document 352 during the new version.

Logging engine 326 may also maintain ledger 356. Metadata logs 356 in one example may simply be hashes of tracked changes 354, including metadata attached to each change. As illustrated throughout this specification, a hash of the changes may be used to verify a later claim to the change, but may not be used to reconstruct the change itself.

Network interface 360 may be provided to communicatively couple server 300 to a wired or wireless network, and may include one or more logic elements as described in FIG. 2.

Collaboration engine 324 is an engine as described in FIG. 2 and, in one example, includes one or more logic elements operable to carry out computer-implemented methods as described in this specification. Software portions of collaboration engine 324 may run as a daemon process.

Collaboration engine 324 may include one or more non-transitory computer-readable mediums having stored thereon executable instructions operable to instruct a processor to provide collaboration services as described herein. At an appropriate time, such as upon booting server 300 or upon a command from operating system 322 or a user 120 or security administrator 150, processor 310 may retrieve a copy of collaboration engine 324 (or software portions thereof) from storage 350 and load it into memory 320. Processor 310 may then iteratively execute the instructions of collaboration engine 324 to provide the desired method.

Logging engine 326 is also provided by way of nonlimiting example, and may be an engine according to this specification, similar to collaboration engine 324.

In an example, collaboration engine 324 is configured to provide collaboration services, such as managing a document 352, which can be viewed and edited in some embodiments by a plurality of authors. Collaboration engine may provide a secure environment for encrypting document 352, managing document 352, decrypting document 352 when it is opened for editing, and tracking and maintaining changes to document 352. In some embodiments, collaboration engine 324 may also be configured to provide key management, including managing diverse keys that pertain to document 352, individual users 120, devices 110, and other entities. Collaboration engine 324 may also be configured to provide for user privacy. Hashing of private data may be one mechanism for user privacy, ensuring that the user's identity can be verified but not reconstructed from the hash. In some embodiments, a digital signature scheme such as Intel® Enhanced Privacy ID (EPID™). EPID extends direct anonymous attestation, which is a cryptographic scheme for providing anonymous signatures. In certain embodiments, direct anonymous attestation (DAA) is configured specifically for use with trusted computing platforms, such as TEE 400, and may be based on RSA authentication.

Logging engine 326 may be configured to receive log entries associated with changes made to document 352, including metadata, and storing those entries to ledger 356. In some but not necessarily all cases, logging engine 326 may receive only a hash of each change entered, and a hash of metadata associated with that change for entry in ledger 356. In an embodiment, ledger 356 is a publically or semi-publically distributed block chain.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

Figure 4:
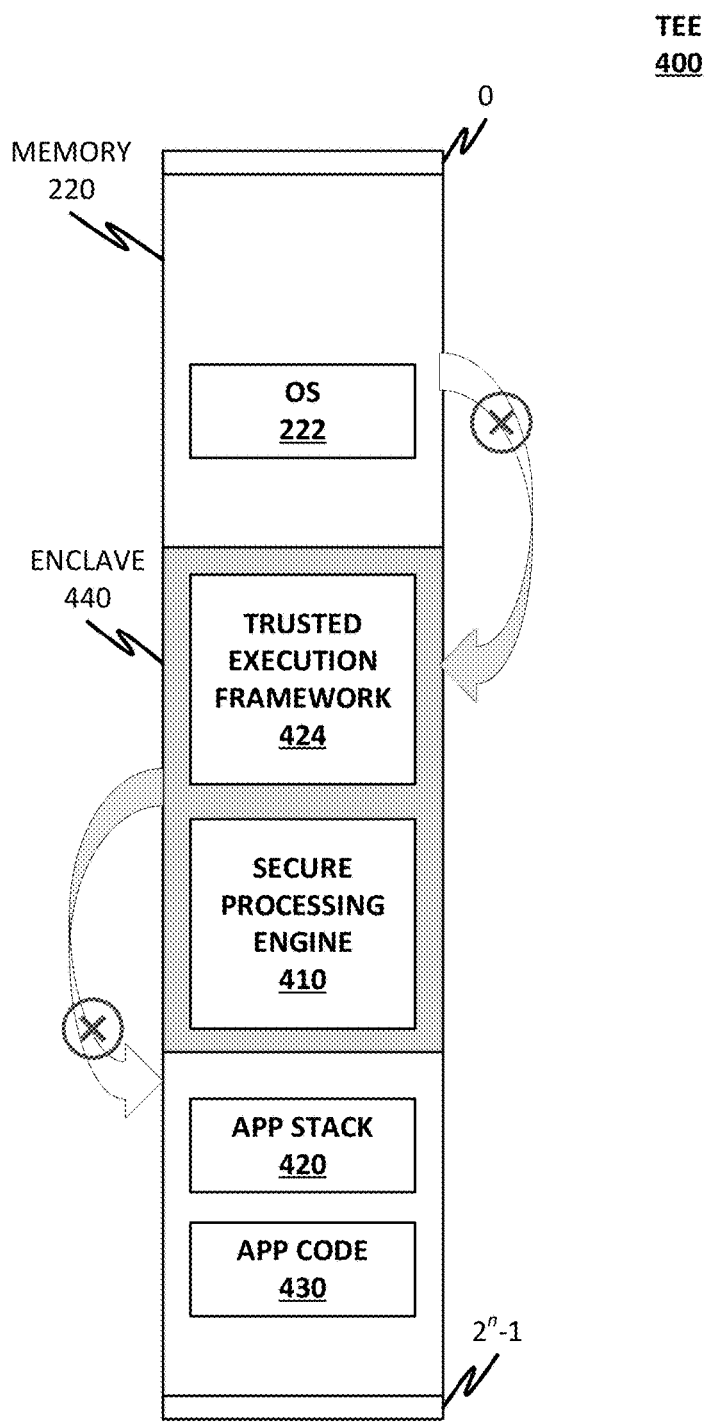
FIG. 4 is a block diagram of a trusted execution environment (TEE) according to one or more examples of the present specification.

FIG. 4 is a block diagram of a trusted execution environment (TEE) 400 according to one or more examples of the present specification.

In the example of FIG. 4, memory 220 is addressable by n-bits, ranging in address from 0 to $2^n-1$. Within memory 220 is an OS 222, enclave 440, application stack 420, and application code 430.

In this example, enclave 440 is a specially-designated portion of memory 220 that cannot be entered into or exited from except via special instructions, such as Intel® SGX or similar. Enclave 440 is provided as an example of a secure environment which, in conjunction with a secure processing engine 410, forms a trusted execution environment (TEE) computing device 200. A TEE 400 is a combination of hardware, software, and/or memory allocation that provides the ability to securely execute instructions without interference from outside processes, in a verifiable way. By way of example, TEE 400 may include memory enclave 440 or some other protected memory area, and a secure processing engine 410, which includes hardware, software, and instructions for accessing and operating on enclave 440. Non-limiting examples of solutions that either are or that can provide a TEE include Intel® SGX, ARM TrustZone, AMD Platform Security Processor, Kinibi, securiTEE, OP-TEE, TLK, T6, Open TEE, and SierraTEE, CSE, VT-x, MemCore, Canary Island, Docker, and Smack. Thus, it should be noted that in an example, secure processing engine 410 may be a user-mode application that operates via trusted execution framework 424 within enclave 440. TEE 400 may also conceptually include processor instructions that secure processing engine 410 and trusted execution framework 424 to operate within enclave 440.

Secure processing engine 410 and trusted execution framework 424 may together form a trusted computing base (TCB), which is a set of programs or computational units that are trusted to be secure. Conceptually, it may be advantageous to keep TCB relatively small so that there are fewer attack vectors for malware objects 182 or for negligent software. Thus, for example, operating system 222 may be excluded from TCB, in addition to the regular application stack 420 and application code 430.

In certain systems, computing devices equipped with the Intel Software Guard Extension (SGX) or equivalent instructions may be capable of providing an enclave 440. It should be noted however, that many other examples of TEEs are available, and TEE 400 is provided only as one example thereof. Other secure environments may include, by way of nonlimiting example, a virtual machine, sandbox, testbed, test machine, or other similar device or method for providing a TEE 400.

In an example, enclave 440 provides a protected memory area that cannot be accessed or manipulated by ordinary computer instructions. Enclave 440 is described with particular reference to an Intel® SGX enclave by way of example, but it is intended that enclave 440 encompass any secure processing area with suitable properties, regardless of whether it is called an "enclave."

One feature of an enclave is that once an enclave region 440 of memory 220 is defined, as illustrated, a program pointer cannot enter or exit enclave 440 without the use of special enclave instructions or directives, such as those provided by Intel® SGX architecture. For example, SGX processors provide the ENCLU[EENTER], ENCLU[ERE- SUME], and ENCLU[EEXIT]. These are the only instructions that may legitimately enter into or exit from enclave 440.

Thus, once enclave 440 is defined in memory 220, a program executing within enclave 440 may be safely verified to not operate outside of its bounds. This security feature means that secure processing engine 410 is verifiably local to enclave 440. Thus, when user 120 provides content to be rendered with secure processing engine 410 of enclave 440, the result of the rendering is verified as secure.

Enclave 440 may also digitally sign its output, which provides a verifiable means of ensuring that content has not been tampered with or modified since being rendered by secure processing engine 410. A digital signature provided by enclave 440 is unique to enclave 440 and is unique to the hardware of the device hosting enclave 440.

Figure 5:
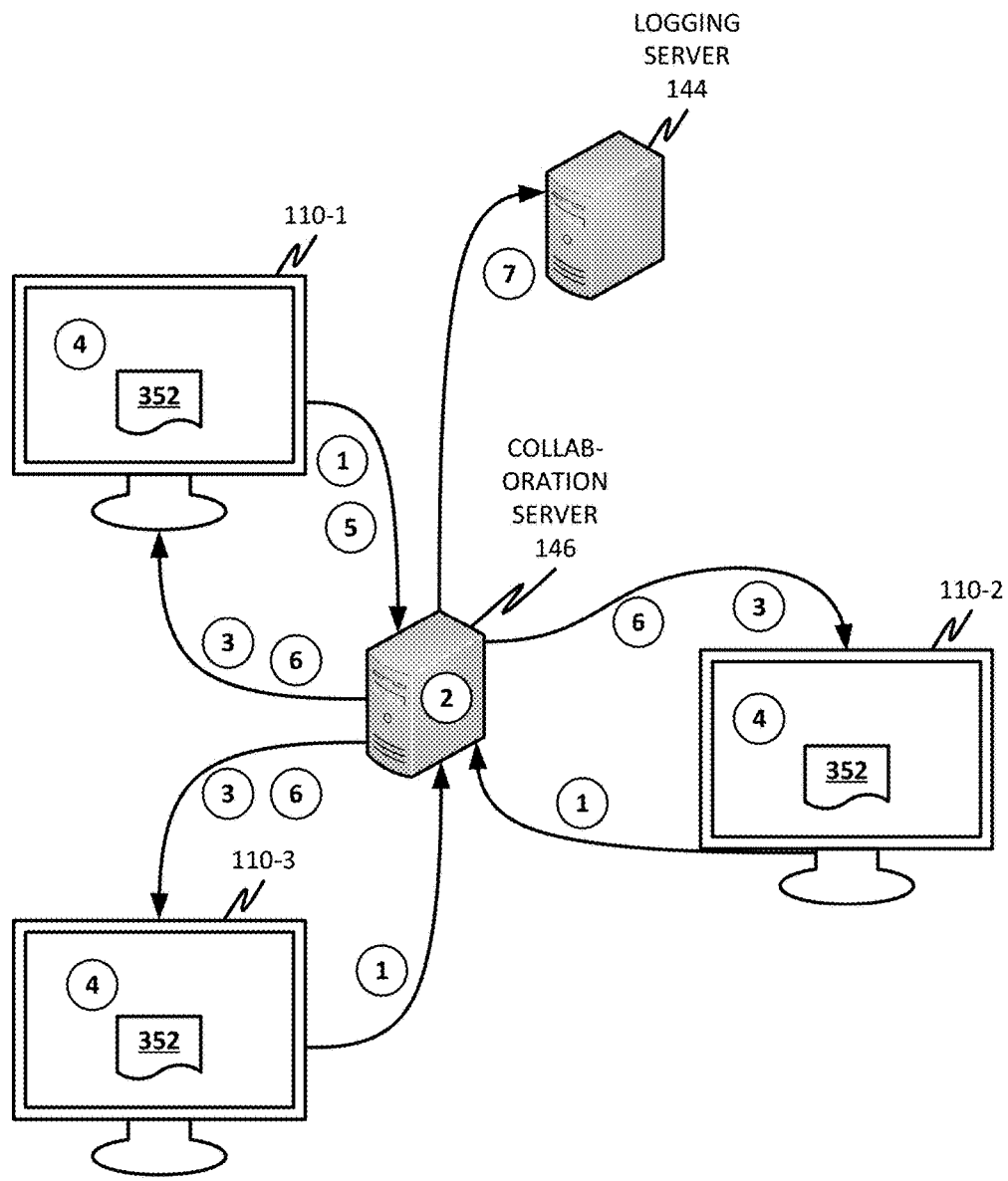
FIG. 5 is a signal flow diagram of a method according to one or more examples of the present specification.

FIG. 5 is a block diagram illustrating a method of providing updates according to one or more examples of the present specification. In this example, individual signal and data flows are represented by numbered operations.

By way of example, co-authors of document 352 create an IP editing task on collaboration server 146. Collaboration server 146 creates a content key and provides a copy to each author, for example, using key exchange tunnels. If it does not already exist, collaboration server 146 may create an empty baseline document 352.

Collaboration server 146 may also provide each author with an ownership key that can be used to authenticate to collaboration server 146, and to sign changes from that author.

In an embodiment, client device 110 does not store a local copy of document 352. Rather, to view document 352, an author or other user 120 must first login to collaboration server 146 with an appropriate key.

Once an editing session starts, collaboration server 146 establishes a PAVP tunnel with each author's client device 110 and shares a screen of the rendered document 352. In a nonlimiting example, rendering occurs exclusively on collaboration server 146.

In operation 1, a plurality of authors operating a plurality of client devices 110-1, 110-2, and 110-3 each authenticate to their individual client devices 110, and then to collaboration server 146, using for example an encryption key provided by collaboration server 146 previously. Once the client devices 110 are authenticated to collaboration server 146, the authors operating client devices 110 have joined the collaboration session. It should be noted that such real-time collaboration is provided by way of example only, and in some cases, a concept of a session may not make sense. Specifically, in some cases, individual authors check documents out and then check them back in, during which authors may locally store copies of document 352. Collaboration server may encrypt the document so that it can only be viewed from an application running within TEE 400. While the document is checked out, editing by other authors is locked out.

In operation 2, collaboration server 146 renders document 352, which may be encrypted with a PAVP encryption key.

In operation 3, collaboration server 146 publishes a view of document 352 to client devices 110.

In operation 4, client devices 110 each render document 352 as provided by collaboration server 146. In this example, document 352 is published as a view-only or read-only view, in which the individual client devices 110 are not able to make changes to document 352. However, operators of client devices 110 are able to see document 352, and thus may determine which changes to make. In some examples, collaboration app 112 may present an interface to a user that appears to edit document 352 in real-time. However, actual editing of document 352 may take place off-line from client devices 110 on collaboration server 146. Any author authorized to edit document 352 may provide KVM commands, which may be signed or encrypted.

In operation 5, a client device 110, in this example 110-1, sends a signed editing command in KVM format to collaboration server 146. In an example, after applying the changes in the KVM command, collaboration server 146 generates a "delta" for the change, and renders the document in its new form.

In operation 6, an updated view is pushed out to the authors on client devices 110. Client devices 110 now display the updated version of document 352. Thus, from the perspective of a user of client device 110, it may appear that he is editing document 352 in real-time. However, in reality, all editing is taking place on collaboration server 146 based on commands provided by clients 110-1. This itself should, however, be recognized as a nonlimiting example.

In operation 7, collaboration server 146 provides a new record to the ledger maintained on logging server 144. As discussed above, the ledger may be maintained on a single monolithic logging server 144, or may be maintained as a distributed block chain that is mirrored in many locations.

Advantageously, edits and changes to document 352 can be either easily proved and recovered based on hashes. However, the hashes are not able to reconstruct the edit themselves. Rather, a party with a claim of having made an edit may provide the proposed edit, and hashing the proposed edit may prove that it matches the hash on logging server 144.

In one example, a verifier may assemble all discrete delta hash values. If the sequence of delta hashes matches the server result, then there is corroborating evidence to trust the central server's assertion of the edit chain.

Figure 6:
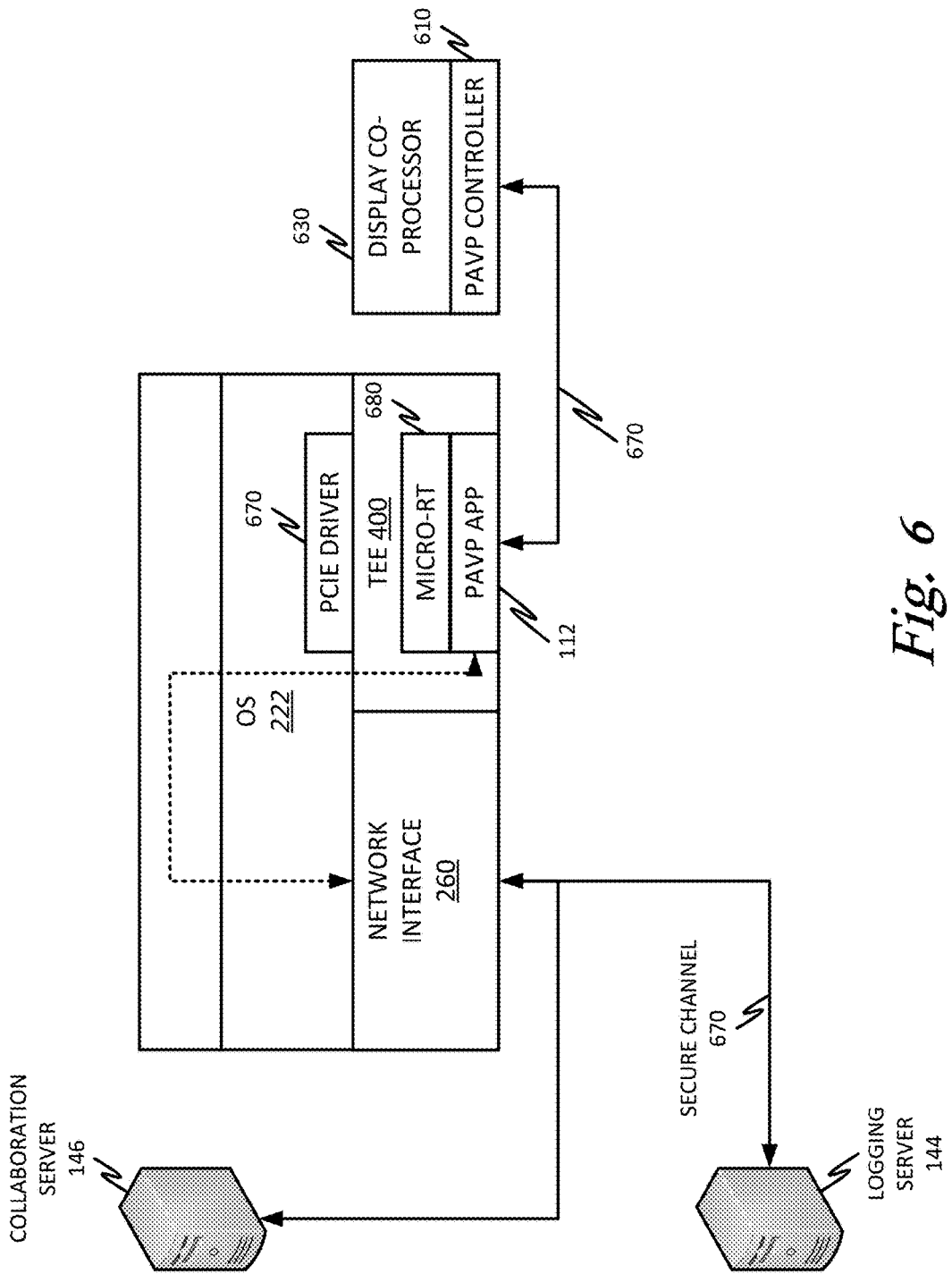
FIG. 6 is a block diagram of collaborative editing according to one or more examples of the present specification.

FIG. 6 is a logical block diagram illustrating functional components of client device 110 according to one or more examples of the present specification. In this example, client 110 is equipped with a display coprocessor 630 that is particularly suited for PAVP operation. Client 110 is also equipped with a PAVP controller 610, which communicatively couples with and interoperates with display coprocessor 630. PAVP controller 610 provides a protected and secure channel 670 to collaboration application 112. Collaboration application 112 may operate within a TEE 400. In some examples, TEE 400 may also include a micro runtime 680 or other abstract computing machine, such as a Java virtual machine, or other virtual machine. In this case, collaboration application 112 need not be a full native application, but may be an interpreted or semi-compiled application, similar to Java byte code. This is a nonlimiting example, however.

In an example, TEE 400 communicatively couples with client 110 via a standard bus, such as a PCIe driver 670. PCIe is a high-speed serial computer expansion bus standard, representing the current state of the art in interconnect. However, any suitable interconnect bus may be used. PCIe driver 670 communicatively couples TEE 400 to operating system 222.

Operating system 222 also communicatively couples to a network interface 260. Network interface 260 enables client device 110 to communicatively couple to collaboration server 146, logging server 144, or any other suitable device, via a secure channel 670. This ensures that data passed between collaboration server 146 and logging server 144 on the one hand, and client 110 on the other hand, is maintained in a secure fashion.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE IMPLEMENTATIONS

There is disclosed in one example, a computing apparatus, comprising: a trusted execution environment (TEE); and one or more logic elements comprising a collaboration engine within the TEE, operable to: receive a change to a secured document via a trusted channel; apply a change to the secured document; and log the change to a ledger.

There is further disclosed an example, wherein logging the change to the ledger comprises hashing the change and logging the hash to the ledger.

There is further disclosed an example, wherein the ledger is a public block chain.

There is further disclosed an example, wherein the collaboration engine is further operable to render the document and export a display of the document via a protected audio-video path (PAVP).

There is further disclosed an example, wherein the PAVP is configured to be logically disposed between the computing apparatus and an end user.

There is further disclosed an example, wherein the collaboration engine is further operable to include a time stamp in the change log.

There is further disclosed an example, wherein the collaboration engine is further operable to log a user authentication indicium.

There is further disclosed an example, wherein the user authentication indicium comprises an authentication type and strength.

There is further disclosed an example, wherein the collaboration engine is further operable to apply the change to a baseline of the document, and construct a current document state at least partially from the change and the baseline.

There is further disclosed an example, wherein the collaboration engine is further configured to perform key management.

There is further disclosed an example, wherein the collaboration engine is further configured to manage diverse keys.

There is further disclosed an example, wherein the collaboration engine is further configured to provide user privacy via direct anonymous attribution.

There is further disclosed an example of one or more tangible, non-transitory computer-readable storage mediums having stored thereon executable instructions for instructing one or more processors for providing a collaboration engine operable for performing any or all of the operations of the preceding examples.

There is further disclosed an example of a method of providing a collaboration engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

There is further disclosed an example of a computing apparatus comprising: a trusted execution environment (TEE); and one or more logic elements comprising a collaboration application, operable to: receive a data stream representing a document over a protected audio-video path (PAVP); and display the document to a user.

There is further disclosed an example, wherein the collaboration application is further configured to: authenticate the user; receive a change to the document from the user; and send a change instruction via a secure channel, the change instruction comprising a substantive change and metadata.

There is further disclosed an example of one or more tangible, non-transitory computer-readable storage mediums having stored thereon executable instructions for instructing one or more processors for providing a collaboration application operable for performing any or all of the operations of the preceding examples.

There is further disclosed an example of a method of providing a collaboration application comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing device, comprising:
   a trusted execution environment (TEE) comprising a memory enclave;
   a protected audio-video path (PAVP); and
   one or more logic elements, implemented at least partly in hardware, comprising a collaboration engine within the TEE, configured to:
   display a secured document without storing a local copy of the secured document on the computing device, the secured document comprising a collaborative multi-author invention description, wherein displaying the secured document comprises rendering the secured document and exporting a display of the secured document via the PAVP;
   receive a change to the secured document via the trusted communication channel, the change comprising an instruction to modify the secured document and provably traceable to an author;
   apply the change to the secured document;
   hash the change;
   sign the hash with a key-value pair provably traceable to the author; and
   log the change to a ledger provably identifying the author as inventor of an invention embodied in the change.

2. The computing device of claim 1, wherein the ledger is a public block chain.

3. The computing apparatus of claim 1, wherein the PAVP is configured to be logically disposed between the computing device and an end user.

4. The computing device of claim 1, wherein the collaboration engine is further configured to include a time stamp in the ledger.

5. The computing device of claim 1, wherein the collaboration engine is further configured to log a user authentication factor.

6. The computing device of claim 5, wherein the user authentication factor comprises an authentication type and strength.

7. The computing device of claim 1, wherein the collaboration engine is further configured to apply the change to a baseline of the secured document, and construct a current document state at least partially from the change and the baseline.

8. The computing device of claim 1, wherein the collaboration engine is further configured to perform key management.

9. The computing device of claim 8, wherein the collaboration engine is further configured to manage diverse keys.

10. The computing device of claim 1, wherein the collaboration engine is further configured to provide user privacy via direct anonymous attribution.

11. One or more tangible, non-transitory computer-readable mediums having stored thereon executable instructions for providing a collaboration engine within a trusted execution environment (TEE), the collaboration engine configured to:
    display a secured document via a protected audio-video path (PAVP) without storing a local copy of the secured document, the secured document comprising a collaborative multi-author invention description, wherein displaying the secured document comprises rendering the secured document and exporting a display of the secured document via the PAVP;
    receive a change to the secured document via the trusted communication channel, the change comprising an instruction to modify the secured document and provably traceable to an author;
    apply the change to the secured document;
    hash the change;
    sign the hash with a key-value pair provably traceable to the author; and
    log the change to a ledger provably identifying the author as inventor of an invention embodied in the change.

12. The one or more tangible, non-transitory computer-readable mediums of claim 11, wherein the ledger is a public block chain.

13. The one or more tangible, non-transitory computer-readable mediums of claim 11, wherein the PAVP is configured to be logically disposed between a computing device and an end user.

14. The one or more tangible, non-transitory computer-readable mediums of claim 11, wherein the collaboration engine is further configured to include a time stamp in the ledger.

15. The one or more tangible, non-transitory computer-readable mediums of claim 11, wherein the collaboration engine is further configured to log a user authentication factor.

16. The one or more tangible, non-transitory computer-readable mediums of claim 15, wherein the user authentication factor comprises an authentication type and strength.

17. The one or more tangible, non-transitory computer-readable mediums of claim 11, wherein the collaboration engine is further configured to apply the change to a baseline of the secured document, and construct a current document state at least partially from the change and the baseline.

18. The one or more tangible, non-transitory computer-readable mediums of claim 11, wherein the collaboration engine is further configured to perform key management.

19. The one or more tangible, non-transitory computer-readable mediums of claim 18, wherein the collaboration engine is further configured to manage diverse keys.

20. A computing apparatus comprising:
    a trusted execution environment (TEE) comprising a memory enclave;
    a trusted communication channel; and
    one or more logic elements, implemented at least partly in hardware, comprising a collaboration application, configured to:
    display a secured document via the trusted communication channel without storing a local copy of the secured document on the computing apparatus, the secured document comprising a collaborative multi-author invention description;
    receive a data stream representing the secured document over a protected audio-video path (PAVP); and display the secured document to a user.

21. The computing apparatus of claim 20, wherein the collaboration application is further configured to:
    authenticate the user;
    receive a real-time change to the secured document from the user; and
    send a change instruction via a secure channel, the change instruction provably traceable to an author and comprising a substantive change and metadata.

22. The computing device of claim 1, wherein the collaboration engine is further to provide process isolation and kernel mode software monitoring; and terminate display of the secured document upon determining that an unverified or untrusted process has started.

23. The one or more tangible, non-transitory computer-readable mediums of claim 11, wherein the collaboration engine is further to provide process isolation and kernel mode software monitoring; and terminate display of the secured document upon determining that an unverified or untrusted process has started.

* * * * *

UNITED STATES PATENT AND TRADEMARK OFFICE
CERTIFICATE OF CORRECTION

PATENT NO. : 10,318,746 B2
APPLICATION NO. : 14/866470
DATED : June 11, 2019
INVENTOR(S) : Oleg Pogorelik et al.

It is certified that error appears in the above-identified patent and that said Letters Patent is hereby corrected as shown below:

In the Claims

In Column 23, Line 3, of Claim 3, delete "apparatus;" and insert -- device; --, therefor.

Signed and Sealed this
Sixth Day of August, 2019

Andrei Iancu
*Director of the United States Patent and Trademark Office*